US009835178B2

(12) United States Patent
Spohr

(10) Patent No.: US 9,835,178 B2
(45) Date of Patent: Dec. 5, 2017

(54) VIBRATING RAM APPARATUS AND METHOD FOR OPERATING THE SAME

(71) Applicant: THYSSENKRUPP TIEFBAUTECHNIK GMBH, Essen (DE)

(72) Inventor: Jochen Spohr, Borken (DE)

(73) Assignee: THYSSENKRUPP TIEFBAUTECHNIK GMBH, Essen (DE)

( * ) Notice: Subject to any disclaimer, the term of this patent is extended or adjusted under 35 U.S.C. 154(b) by 157 days.

(21) Appl. No.: 14/784,016

(22) PCT Filed: Mar. 31, 2014

(86) PCT No.: PCT/EP2014/000854
§ 371 (c)(1),
(2) Date: Oct. 12, 2015

(87) PCT Pub. No.: WO2014/166605
PCT Pub. Date: Oct. 16, 2014

(65) Prior Publication Data

US 2016/0069357 A1 Mar. 10, 2016

(30) Foreign Application Priority Data

Apr. 12, 2013 (DE) ........................ 10 2013 103 715

(51) Int. Cl.
*F16D 31/02* (2006.01)
*F15B 9/14* (2006.01)
(Continued)

(52) U.S. Cl.
CPC .................. *F15B 9/14* (2013.01); *E02D 7/18* (2013.01); *F02D 17/04* (2013.01); *F02D 29/04* (2013.01); *F15B 15/18* (2013.01)

(58) Field of Classification Search
CPC ....... E02D 7/18; F02N 11/0803; F02D 17/04; F02D 29/04
(Continued)

(56) References Cited

U.S. PATENT DOCUMENTS

| | | | |
|---|---|---|---|
| 3,866,420 | A | 2/1975 | Appel |
| 4,168,612 | A | 9/1979 | Nikolaus |

(Continued)

FOREIGN PATENT DOCUMENTS

| | | | |
|---|---|---|---|
| DE | 2236134 | A | 2/1974 |
| DE | 2700803 | A | 7/1978 |

(Continued)

OTHER PUBLICATIONS

English Language Abstract of DE3806194.

(Continued)

*Primary Examiner* — Michael Leslie
(74) *Attorney, Agent, or Firm* — thyssenkrupp North America, Inc.

(57) ABSTRACT

The invention relates to a method for operating a vibrating ram arrangement comprising a hydraulic assembly with a hydraulic pump driven by an internal combustion engine, a vibrator connected to the hydraulic assembly in a hydraulic circuit, a hydraulic clamping device connected to the vibrator for a material to be rammed, and a controller, with which a fluid flow through a hydraulic motor of the vibrator can be activated and deactivated and with which the hydraulic clamping device can be closed and opened. According to the invention, the controller requests at least one operating state value during a pause in the operation when the vibrator is deactivated and automatically stops the internal combustion engine if the operating state value corresponds to a specified value. Additionally, the controller automatically starts the
(Continued)

internal combustion engine in order to resume the vibrating ram operation in the event of a user signal.

7 Claims, 2 Drawing Sheets

(51) Int. Cl.

| | |
|---|---|
| ***F02D 29/04*** | (2006.01) |
| ***F02D 17/04*** | (2006.01) |
| ***E02D 7/18*** | (2006.01) |
| ***F15B 15/18*** | (2006.01) |

(58) Field of Classification Search

USPC ............................................... 60/399; 417/34

See application file for complete search history.

(56) References Cited

U.S. PATENT DOCUMENTS

| | | | | |
|---|---|---|---|---|
| 7,500,535 | B2 * | 3/2009 | Kamon | F02N 11/0803 60/399 |
| 8,312,716 | B2 | 11/2012 | Deeken | |
| 8,727,233 | B2 * | 5/2014 | Karp | B08B 3/026 417/34 |
| 9,399,850 | B2 | 7/2016 | Heichel | |
| 2009/0007559 | A1 | 1/2009 | Dazin | |

FOREIGN PATENT DOCUMENTS

| | | | |
|---|---|---|---|
| DE | 3806194 | A | 8/1989 |
| DE | 202007014676 | U | 2/2009 |
| EP | 2014835 | A1 | 1/2009 |
| EP | 2557233 | A | 2/2013 |

OTHER PUBLICATIONS

ThyssenKrupp GfT Bautechnik GmbH brochure titled “MULLER-vibrators. The ideal solution for driving and extracting.”) dated May 2011.

German Language International Search Report for International patent application No. PCT/EP2014/000854; dated Jul. 25, 2014.

English translation of International Search Report for International patent application No. PCT/EP2014/000854; dated Jul. 25, 2014.

* cited by examiner

VIBRATING RAM APPARATUS AND METHOD FOR OPERATING THE SAME

CROSS REFERENCE TO RELATED APPLICATIONS

This application is a U.S. National Stage Entry of International Patent Application Serial Number PCT/EP2014/000854, filed Mar. 31, 2014, which claims priority to German patent application no. DE 102013103715.1 filed Apr. 12, 2013, the entire contents of both of which are incorporated herein by reference.

FIELD

The present disclosure relates to a method for operating a vibrating ram arrangement, for use in, for example, driving pilings into the ground.

BACKGROUND

During the vibrating ramming operation, the clamping device is closed and the vibrator vibrates as a result of a rotation of the imbalance masses owing to a fluid flow of hydraulic oil through the hydraulic circuit. A vibrating ram arrangement on which the invention is based is known, for example, from the brochure "Müller-Vibratoren, Die perfekte Lösung zum Rammen and Zeihen [Müller vibrators, the perfect solution for ramming and drawing]", ThyssenKrupp GfT Bautechnik GmbH 5/2011.

The vibrating ramming is based on the principle of placing the ground in a quasi-liquid state. This is achieved by vibrating the pile when it strikes on the ground. The surface vibration of the material which is to be driven is significantly reduced by the vibration and as a result fast penetration progress is made possible. The vibration frequency can be, for example, between 10 Hz and 60 Hz, in particular between 30 Hz and 50 Hz. Typical piles are piling profiles, posts, planks and tubes for foundation structures for buildings and positionally fixed technical installations.

In practice, during the operation of the vibrating ram arrangement, there are frequently operating pauses in which the vibrator is deactivated, for example if a pile is taken up and positioned, if the vibrator has to be aligned with the pile or else newly aligned, or if the vibrator which is arranged on a carrier implement, for example on a crane, is moved with or without the pile which is taken up by the clamping device to another position, wherein, under certain circumstances, the hydraulic assembly also has to be adjusted.

In such operating pauses, the internal combustion engine can be stopped, that is to say switched off, by an operator. However, the internal combustion engine generally continues to run in the idling mode in operating pauses. An operator frequently also does not at all consider stopping the internal combustion engine in operating pauses for multiple reasons, because, owing to the spatial separation of the vibrator and hydraulic assembly as well as the ambient noise which is present at a construction site, the operator is not aware that the internal combustion engine is continuing to run. In addition, in operating pauses the operator is often occupied with other tasks than controlling the vibrating ram arrangement.

SUMMARY

An object of the present disclosure is the specification of a method for operating a vibrating ram arrangement which permits costs to be reduced without adverse effects on comfort and operational safety. Furthermore, a vibrating ram arrangement is to be specified which permits the method to be carried out.

Described herein is a method for operating a vibrating ram apparatus or arrangement. The ram apparatus comprises a hydraulic assembly having an internal combustion engine and a hydraulic pump driven by the internal combustion engine, a vibrator connected to the hydraulic assembly in a hydraulic circuit and having rotatably mounted imbalance masses and at least one hydraulic motor as a drive of the imbalance masses, a hydraulic clamping device connected to the vibrator for use on a pile, and a controller. A fluid flow through the at least one hydraulic motor can be activated and deactivated to switch the vibrator on and off and with which the hydraulic clamping device can be closed and opened.

BRIEF DESCRIPTION OF THE DRAWINGS

The present disclosure is described in detail below with reference to the attached drawing figures, wherein.

DETAILED DESCRIPTION

Figure 1:
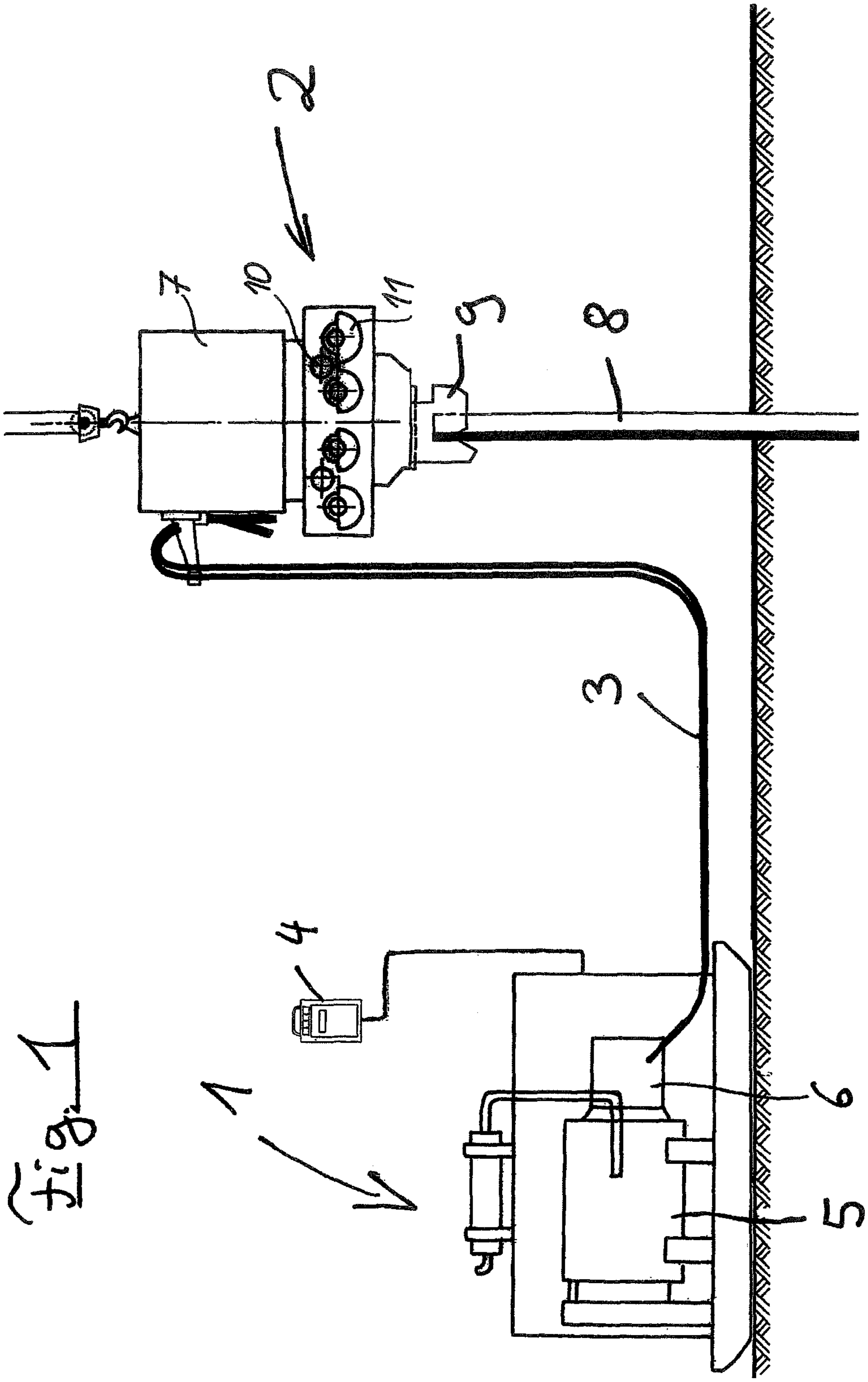
FIG. 1 is a schematic side view of a vibrating ram apparatus in operation driving a piling into the ground.

Disclosed herein is a method of operating a vibrating ram apparatus or arrangement. The ram apparatus comprises a hydraulic assembly having an internal combustion engine and a hydraulic pump driven by the internal combustion engine, a vibrator connected to the hydraulic assembly in a hydraulic circuit and having rotatably mounted imbalance masses and at least one hydraulic motor as a drive of the imbalance masses, a hydraulic clamping device connected to the vibrator for use on a pile, and a controller. A fluid flow through the at least one hydraulic motor can be activated and deactivated to switch the vibrator on and off and with which the hydraulic clamping device can be closed and opened. In addition, during an operating pause when a vibrator is deactivated, a controller interrogates at least one operating state value and automatically stops the internal combustion engine if the operating state value corresponds to a predefined value. Furthermore, the controller automatically starts the internal combustion engine when there is a user signal to continue the vibrating ramming operation.

According to the invention, the stopping of the internal combustion engine is carried out not only taking into account the activation state of the vibrator but additionally taking into account an operating state value which is specific to the vibrating ram arrangement, wherein it is particularly by means of this additional interrogation that a high degree of comfort and operational reliability can be ensured.

Stopping the internal combustion engine in operating pauses permits a considerable quantity of fuel, that is to say usually diesel, to be saved. The invention is based here on the realization that the internal combustion engine often runs for longer without load in the idling mode than under load in the actual vibrating ramming operation. Depending on the respective requirements made of the vibrating ramming, the proportion of time for which the internal combustion engine runs under load can be, for example, only 10% to 20% of the entire operating time of the hydraulic assembly.

The saving in fuel leads to lower costs and smaller quantities of exhaust gas. Furthermore, the noise emissions overall are also significantly reduced, wherein a lower degree of wear of the components of the vibrating ram arrangement is also produced. The operating time of the internal combustion engine is significantly reduced, said operating time frequently forming the basis for the definition of servicing intervals and the calculation of the residual value of the internal combustion engine.

According to a first variant of the method according to the invention, the open state of the clamping device is interrogated as an operating state value, wherein the internal combustion engine is not stopped if the clamping device is closed. If, in contrast, the clamping device is opened, the pile cannot be driven in, with the result that the internal combustion engine then can be stopped if no further peripheral conditions which run counter to stopping the internal combustion engine are present. In particular, within the scope of the invention it is also possible to interrogate and evaluate a plurality of different operating state values in order to determine whether it is advantageous to stop the internal combustion engine.

The switching operation is generally configured in such a way that the clamping device can be opened only if the vibrator is deactivated. Such control is easily possible because the clamping device and the vibrator can be supplied with hydraulic oil by the hydraulic assembly in parallel via separate circuits or connections.

According to a second variant of the method according to the invention, the internal combustion engine can be stopped even when a clamping device is closed as long as the vibrator is deactivated and it is ensured that the clamping device remains closed. While the driving of the vibrator requires a continuous volume flow through the hydraulic motor, in the case of the clamping device a static clamping pressure is preferably built up and maintained, so that it is then not necessary to continue to supply hydraulic oil to the hydraulic assembly in order to keep the clamping device closed.

The deactivated state of the vibrator can occur as a result of a corresponding setting, selected by a user, at the controller. In addition, the state of the vibrator can also be monitored with a rotational speed sensor or frequency sensor, wherein the signal of the sensor is then taken into account within the scope of the invention as an operating state value.

According to the second variant of the method, at least one clamping pressure of the clamping device is preferably interrogated as an operating state value, wherein the internal combustion engine is if, in the case of a closed clamping device, the clamping pressure is higher than the minimum pressure. On this basis, the clamping pressure can also be continuously interrogated, wherein the internal combustion engine starts automatically if the clamping pressure is lower than the minimum pressure. Basically, for the stopping of the internal combustion engine it is possible to provide a higher limiting value for the clamping pressure than for the automatic starting, in order to avoid frequent stopping and starting of the internal combustion engine.

In the case of leakage at the clamping device and in the feed lines to the clamping device, in the event of a malfunction of a valve or other similar failure, the clamping pressure in the case of a stopped internal combustion engine cannot be maintained over a relatively long time period. According to one preferred development of the second variant of the method, it is therefore provided that the controller changes into a safety mode if, after the internal combustion engine has stopped, renewed starting occurs owing to a drop in the clamping pressure within a predefined time interval, wherein the internal combustion engine is not switched off again in the safety mode. The internal combustion engine then continues to run at least independently of the activation state of the vibrator, but stopping of the internal combustion engine according to the first variant of the method can continue to take place when a clamping device is opened.

By means of the monitoring of the clamping pressure, a particularly high degree of operational safety can be achieved. It is also expedient here to display a fault message or a malfunction to a user by means of a suitable display device, so that the user can check the clamping device and the assigned hydraulic circuit. In particular when there is a leak there is the risk of soiling of the surroundings, which can be prevented by displaying the malfunction. If the time between the stopping and starting of the internal combustion engine is particularly short, this can be an indication of a serious failure, with the result that the controller can then operationally also be configured in such a way that the vibrating ram arrangement is completely switched off until a failure is eliminated or at least the controller is reset.

Basically, after the comparison of the at least one operating state value with the assigned predefined value, the internal combustion engine can only be stopped with a delay, so that the internal combustion engine is not stopped in only brief operating pauses.

If the internal combustion engine is stopped, it is automatically started again if a user signal to continue the vibrating ramming operation is present at the controller. In the first variant of the method described above, the internal combustion engine is expediently started when a user makes a “close clamping device” input at the controller. According to the second variant, the internal combustion engine is expediently started when a user makes a “vibrator ON” input at the controller. At least if the internal combustion engine and the hydraulic oil have a suitable operating temperature, the internal combustion engine can generally be started immediately, with the result that a user generally does not perceive any difference at all and no adverse effect compared to the method known from the prior art in which the internal combustion engine continues to run in the idling mode without a load.

If the hydraulic oil is still cold at a lower ambient temperature and after a short operating period, it has a high viscosity, as a result of which during operation of the vibration ram arrangement increased friction losses and flow losses occur, wherein an increased resistance also occurs when the internal combustion engine starts. Under these circumstances, it can be advantageous if the internal combustion engine is not stopped in operating pauses. It can therefore be provided that a hydraulic oil temperature is interrogated as an additional operating state value, wherein the internal combustion engine is not stopped if the hydraulic oil temperature is below an assigned minimum temperature.

Additionally or alternatively, in order to protect the internal combustion engine, an engine oil temperature of the internal combustion engine can also be interrogated as an additional operating state value, wherein the internal combustion engine is not stopped if the engine oil temperature is below an assigned minimum temperature.

When an internal combustion engine is stopped, the hydraulic oil temperature and/or the engine oil temperature can also be monitored continuously, wherein when a predefined lower limit is undershot the internal combustion engine is then started in order to avoid excessive cooling.

The subject matter of the invention is also a vibrating ram arrangement for carrying out the method according to the invention. The vibrating ram arrangement comprises a hydraulic assembly having an internal combustion engine and a hydraulic pump which is driven by the internal combustion engine, a vibrator which is connected to the hydraulic assembly in a hydraulic circuit and has rotatably mounted imbalance masses and at least one hydraulic motor as a drive of the imbalance masses, a hydraulic clamping device, connected to the vibrator, for a pile, and a controller, with which a fluid flow through the at least one hydraulic motor can be activated and deactivated to switch the vibrator on and off and with which the hydraulic clamping device can be closed and opened.

The vibrating ram arrangement is characterized in that the controller is configured to interrogate, in an operating pause when a vibrator is deactivated, at least one operating state value and to stop the internal combustion engine automatically if the operating state value corresponds to a predefined value, and in that the controller is configured to start the internal combustion engine automatically when there is a user signal to continue the vibrating ramming operation.

The present disclosure will be discussed in further detail below with reference to the attached drawing figures that illustrate one exemplary embodiment.

FIG. 1 shows the basic design of a vibrating ram arrangement which has, separately from one another, a hydraulic assembly 1 and a vibrator 2 which are connected in a hydraulic circuit by means of hydraulic hoses and are therefore spatially separated from one another. The hydraulic assembly 1 has a controller S, wherein the controller S can be controlled by means of a remote control 4 which communicates with the controller S by cable or a in a cableless fashion. The functions for the control of the vibrating ramming operation can be set by an operator at the remote control 4.

The hydraulic assembly comprises an internal combustion engine 5 which is run on diesel, and a hydraulic pump 6 which is driven by the internal combustion engine 5. The vibrator 2 is supported in the illustrated exemplary embodiment by means of a vibration isolator 7 which is suspended from a crane. A pile 8 which is to be inserted is clamped on the underside of the vibrator 2 in a hydraulic clamping device in the form of a hydraulic collet chuck.

In the illustrated embodiment, the vibrator 2 has two hydraulic motors 10, with each of which two imbalance masses 11 which rotate in opposite directions can be driven. During the vibrating ramming operation, the vibrator 2 is made to vibrate in the vertical direction by the eccentrically mounted imbalance masses 11, wherein the moments cancel one another in the horizontal direction as a result of opposing movement of the imbalance masses 11. The drive of the imbalance masses 11 is provided by means of gearwheels (not illustrated).

So that the hydraulic motors 10 continuously drive the imbalance masses 11, a continuous fluid flow of hydraulic oil is conducted through the hydraulic circuit with the hydraulic pump 6 which is driven by the internal combustion engine 5. In FIG. 1, the hydraulic hoses 3 are illustrated only schematically. The clamping device 9 is usually supplied with hydraulic oil separately from the vibrator 2 by the hydraulic assembly 1. While a continuous fluid flow is necessary for operation of the vibrator 2, for the clamping device 9 it is sufficient if a static fluid pressure is built up and maintained.

Figure 2:
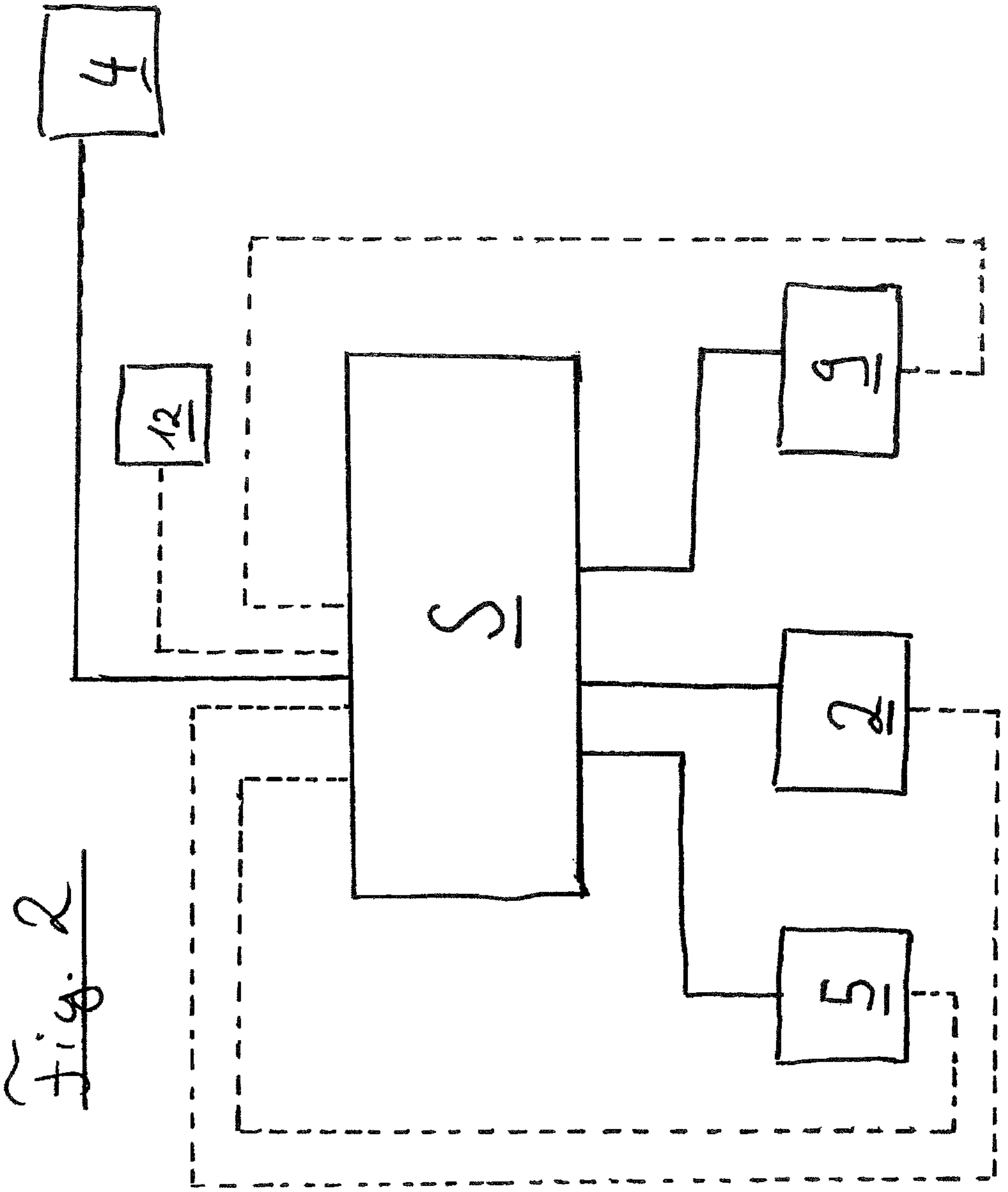
FIG. 2 is a simplified schematic hydraulic circuit diagram of the vibrating ram apparatus of FIG. 1.

According to the invention there is provision that in an operating pause when a vibrator 2 is deactivated the controller S interrogates at least one operating state value and the internal combustion engine 5 is stopped automatically if the operating state value corresponds to a predefined value. The controller S is also configured in such a way that when there is a user signal to continue the vibrating ramming operation the internal combustion engine 5 starts automatically. FIG. 2 shows, in a highly schematic illustration, the controller S which controls the vibrator 2, the internal combustion engine 5 and the clamping device 9. The vibrator 2 and the clamping device 9 can be controlled by virtue of the fact that a fluid flow or a fluid pressure is made available with valves which can be operated by the controller S.

The interrogation of operating state values is indicated in FIG. 2 by dashed lines, wherein corresponding sensors can be provided at the various devices at which the operating state value is interrogated.

In the simplest case, checking can take place as to whether the clamping device 9 is closed. When the clamping device 9 is closed, no vibrating ramming operation is possible, with the result that the internal combustion engine 5 can then be stopped, for example by interrupting the fuel supply.

Even if the clamping device 9 is opened, it is possible under certain circumstances for stopping of the internal combustion engine 5 to be disadvantageous, in particular if an engine oil temperature of the internal combustion engine 5 or a hydraulic oil temperature of the hydraulic oil in the hydraulic circuit is too low. Correspondingly, operating state values can also be interrogated at the internal combustion engine 5 and used as a basis for the controller S to decide whether stopping of the internal combustion engine 5 is expedient. In FIG. 2, an additional sensor 12 is also indicated, wherein said sensor can be, for example, a temperature sensor in the hydraulic circuit which determines the hydraulic oil temperature.

According to one variant of the method according to the invention, the internal combustion engine 5 can be stopped even when a clamping device 9 is closed if the vibrator 2 is not active. Then, not only the state "OPEN" and "CLOSED" of the clamping device 9 but also a clamping pressure is interrogated as operating state values. If the static clamping pressure is sufficient to keep the clamping device 9 closed, the internal combustion engine 5 can be stopped. The scope of the invention also includes that the clamping pressure is then monitored continuously, wherein the internal combustion engine 5 is stopped automatically by the controller S if the clamping pressure undershoots a predefined critical value.

If this already takes place after a short time, this behavior can be an indication of a malfunction, with the result that various safety measures can then be taken. Firstly, the controller S can change into a safety mode, wherein the internal combustion engine 5 is then not switched off again. Additionally or alternatively, a failure or fault signal can also be output to a user. If the operating state value which is determined indicates a serious malfunction, the entire vibrating ram arrangement can also be switched off.

The state of the vibrator can also be derived from whether it is supplied with a fluid flow. In FIG. 2 it is also indicated that it is, however, also basically possible to interrogate operating state values at the vibrator, for example the rotational speed of the vibrator.

The invention claimed is:

1. A vibrating ram apparatus, comprising:

a hydraulic assembly having a hydraulic pump configured to pump hydraulic fluid therefrom and an internal combustion engine operatively coupled to and configured to drive said pump;

a vibrator operatively coupled to the hydraulic assembly in a hydraulic circuit having at least one rotatably mounted imbalance mass configured to create vibratory motion, and at least one hydraulic motor operatively coupled to and configured to drive said imbalance mass;

a hydraulic clamping device coupled to said vibrator and configured to selectively clamp onto a pile to be driven; and a controller in communication with said hydraulic motor and configured to selectively activate and deactivate a hydraulic fluid flow through said at least one hydraulic motor, so as to both selectively switch said vibrator on and off, and selectively close and open said hydraulic clamping device, interrogate, during an operating pause when said vibrator is in a deactivated state, at least one operating state value of the vibrating ram apparatus, said at least one operating state value including a clamping pressure of the hydraulic clamping device, automatically stop said internal combustion engine if the clamping pressure exceeds a predefined minimum value, and automatically start the internal combustion engine when the clamping pressure is less than a predefined minimum pressure.

2. A method for operating a vibrating ram apparatus, comprising:

providing a vibrating ram apparatus as described in claim 1;

closing the clamping device;

activating the vibrator to rotate the at least one imbalance mass by a flow of hydraulic fluid through the hydraulic circuit and perform a resulting vibrating ramming operation on a pile to be driven;

deactivating the vibrator during an operating pause;

during the operating pause, interrogating at least one operating state value, said at least one operating state value including at least a clamping pressure of the clamping device, said interrogating being performed by the controller;

automatically stopping, by the controller, the internal combustion engine when the clamping device is closed and the interrogated clamping pressure exceeds a minimum predefined pressure; and automatically starting, by the controller, the internal combustion engine when the interrogated clamping pressure is less than a minimum predefined pressure.

3. The method of claim 2, wherein an open state of the clamping device is interrogated by the controller as an operating state value, and wherein the internal combustion engine is not stopped if the clamping device is closed.

4. The method of claim 2, wherein the controller switches into a safety mode if, after the internal combustion engine has stopped, renewed starting occurs owing to a drop in the clamping pressure within a predefined time interval, wherein the internal combustion engine is not switched off again in the safety mode.

5. The method of claim 2, wherein, during said step of automatically stopping the internal combustion engine the internal combustion engine is only stopped with a delay.

6. The method of claim 2, wherein a hydraulic fluid temperature is interrogated as an additional operating state value, wherein the internal combustion engine is not stopped if the hydraulic oil temperature is below an assigned minimum temperature.

7. The method of claim 2, wherein an engine oil temperature of the internal combustion engine is interrogated as an additional operating state value, wherein the internal combustion engine is not stopped if the engine oil temperature is below an assigned minimum temperature.

* * * * *